United States Patent
Yarbrough et al.

(10) Patent No.: US 11,080,605 B1
(45) Date of Patent: Aug. 3, 2021

(54) INTEREST MATCHED INTERACTION INITIALIZATION

(71) Applicant: Wells Fargo Bank, N.A., San Francisco, CA (US)

(72) Inventors: Chad Allen Yarbrough, St. Louis, MO (US); John C. Brenner, Chesterfield, MO (US); Jeniffer R. Justice, Floyd Knobs, IN (US); Gwendoria M. Salley, Rock Hill, SC (US); Zachary Scott Miinch, University City, MO (US); James D. Cahill, Belmont, MA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 864 days.

(21) Appl. No.: 15/391,691

(22) Filed: Dec. 27, 2016

(51) Int. Cl.
  *G06N 5/02* (2006.01)
  *H04L 29/08* (2006.01)

(52) U.S. Cl.
  CPC ............ *G06N 5/022* (2013.01); *H04L 67/10* (2013.01); *H04L 67/306* (2013.01)

(58) Field of Classification Search
  CPC ...... G06N 20/00; G06N 7/005; G06N 3/0454; G06N 3/084; G06N 20/10; G06N 5/04;
  (Continued)

(56) References Cited

U.S. PATENT DOCUMENTS 5,801,700 A * 9/1998 Ferguson ............... G06F 3/0486
  715/748
8,682,723 B2 3/2014 Parsons et al.
(Continued)

FOREIGN PATENT DOCUMENTS

WO WO-2013116816 A1 8/2013

OTHER PUBLICATIONS

Burns, M.J., "A multidimensional approach to characterizing and visualizing latent relationships in enterprise social networks", Bell Labs Technical Journal, vol. 17, No. 1, pp. 201-217, (Jun. 2012), 17 pgs.

(Continued)

*Primary Examiner* — Miranda M Huang
*Assistant Examiner* — Catherine F Lee
(74) *Attorney, Agent, or Firm* — Schwegman Lundberg & Woessner, P.A.

(57) ABSTRACT

Systems and techniques for interest matched interaction initialization are described herein. A first set of profile attributes for a first user and second set of profile attributes for a second user may be obtained. A first set of data sources and a second set of data sources may be identified respectively using the first set and second set of profile attributes. A first dataset and a second dataset may be collected respectively using the first and second set of data sources. An interest vector model may be generated using data elements of the first dataset based on an interest identified in the first dataset. The second dataset may be evaluated using the interest vector model to identify the interest as a shared interest in the second dataset. An interaction initialization item may be generated by identifying content associated with the shared interest. The interaction initialization item may be transmitted to a device.

21 Claims, 5 Drawing Sheets

(58) Field of Classification Search
CPC ........ G06N 20/20; G06N 5/022; G06N 5/003;
G06N 3/08; G06N 3/04; G06N 3/0445;
G06N 5/025; G06N 5/02; G06N 5/045;
G06N 3/088; G06N 5/048; G06N 3/0427;
G06N 99/005; G06N 3/006; G06N 3/02;
G06N 3/082; G06N 3/0472; G06N 5/043;
G06N 5/041; G06N 3/0436; G06N
3/0481; G06N 99/00; G06N 3/00; G06N
3/126; G06N 5/027; G06N 7/00; G06F
16/9535; G06F 3/048; G06F 16/248;
G06Q 50/01; G06Q 30/02; G06Q
30/0269; G06Q 30/0201; G06Q 30/0255;
H04L 67/306; H04L 67/10
See application file for complete search history.

(56) References Cited

U.S. PATENT DOCUMENTS

| | | | |
|---|---|---|---|
| 8,812,392 | B2 | 8/2014 | Shahghasemi |
| 8,825,759 | B1* | 9/2014 | Jackson ................. H04L 67/02 |
| | | | 709/204 |
| 9,330,422 | B2 | 5/2016 | Bourdaillet et al. |
| 10,198,775 | B2* | 2/2019 | Lobb ..................... G06Q 50/01 |
| 2008/0114737 | A1 | 5/2008 | Neely et al. |
| 2009/0119173 | A1 | 5/2009 | Parsons et al. |
| 2009/0164400 | A1* | 6/2009 | Amer-Yahia ...... G06Q 30/0631 |
| | | | 706/45 |
| 2013/0046770 | A1* | 2/2013 | Tseng .................. G06F 16/9535 |
| | | | 707/748 |
| 2013/0159885 | A1 | 6/2013 | Yerli |
| 2014/0040368 | A1 | 2/2014 | Janssens |
| 2014/0089403 | A1 | 3/2014 | Gross et al. |
| 2014/0244744 | A1 | 8/2014 | Lyren |
| 2014/0280549 | A1 | 9/2014 | Rajan et al. |
| 2014/0365349 | A1 | 12/2014 | Kennon |
| 2015/0032535 | A1 | 1/2015 | Li et al. |
| 2015/0039424 | A1 | 2/2015 | Narravula et al. |
| 2015/0170152 | A1 | 6/2015 | Shaffer et al. |
| 2015/0172227 | A1 | 6/2015 | Grove, II |
| 2015/0178282 | A1 | 6/2015 | Gorur et al. |
| 2016/0125426 | A1* | 5/2016 | Francolla ........... G06Q 30/0201 |
| | | | 705/7.29 |
| 2017/0118207 | A1* | 4/2017 | Madhu ............... G06K 9/00288 |

OTHER PUBLICATIONS

Mangold, W. Glynn, et al., "Social media: The new hybrid element of the promotion mix", Business horizons 52.4 (2009): 357-365, (2009), 10 pgs.

* cited by examiner

INTEREST MATCHED INTERACTION INITIALIZATION

TECHNICAL FIELD

The present subject matter relates to the field of predictive analytics. Specifically, in some example embodiments, in generating response options to event-driven predicted interactions using user profile data.

BACKGROUND

Employees of an organization interact with individuals having a relationship with the organization. The employees interact with the individuals through computing systems. The computing systems contain profile information for the individuals. The profile information contains information that the employees use when interacting with the individuals.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An employee of an organization (e.g., product dealer, bank, etc.) play be assigned as a representative for a group of individuals having a relationship with the organization. For example, an investment advisor may have a portfolio of customers that have assets under management with a financial institution. A computing system of the organization may maintain a profile for each of the individuals including contact information, demographic information, contact history, etc. The employee may use the profile information to determine how, when, and where to interact with an individual. However, the profiles maintained by the computing system may not be regularly updated and may not contain sufficient information to make a determination regarding when the employee should interact. In addition, circumstances such as employee workload, number of individuals the employee represents, etc. may prevent the profiles maintained by the computing system to be effective in providing the employee the information used to determine when an interaction should occur between the employee and an individual. This may lead some individuals to establish relationships with other organizations.

Using the profile information to gather additional information about an individual, such as interests, to initialize interaction between the employee and the individual may solve the problem of losing individuals to other organizations because of an ineffective profile management computing system. The profile information of an individual may include attributes such as employer, schools attended, interaction data, social media presence, etc. that may be used to obtain additional information about the individual to determine the individual's interests. The data regarding the individual's interest may be used to create a model. The model may be compared to a profile of the employee to find shared interests.

The shared interest may be used to find content that may be used to generate an interaction initialization item that the employee can instruct the computing system to transmit to the individual to begin an interaction. For example, news articles, recipes, restaurant reviews, web content, social media posts, etc. may be used to generate interaction initialization items that may be transmitted to a display of the employee. In the example, a photo or other representation of the individual may be transmitted to the display along with the interaction initialization items and the employee may instruct the computing device to transmit one or more of the interaction initialization items by dragging and dropping the one or more interaction initialization items onto the representation of the individual. Thus, the computing system provides the employee with relevant information in which the employee and the individual have a shared interest to initialize an interaction.

Figure 1:
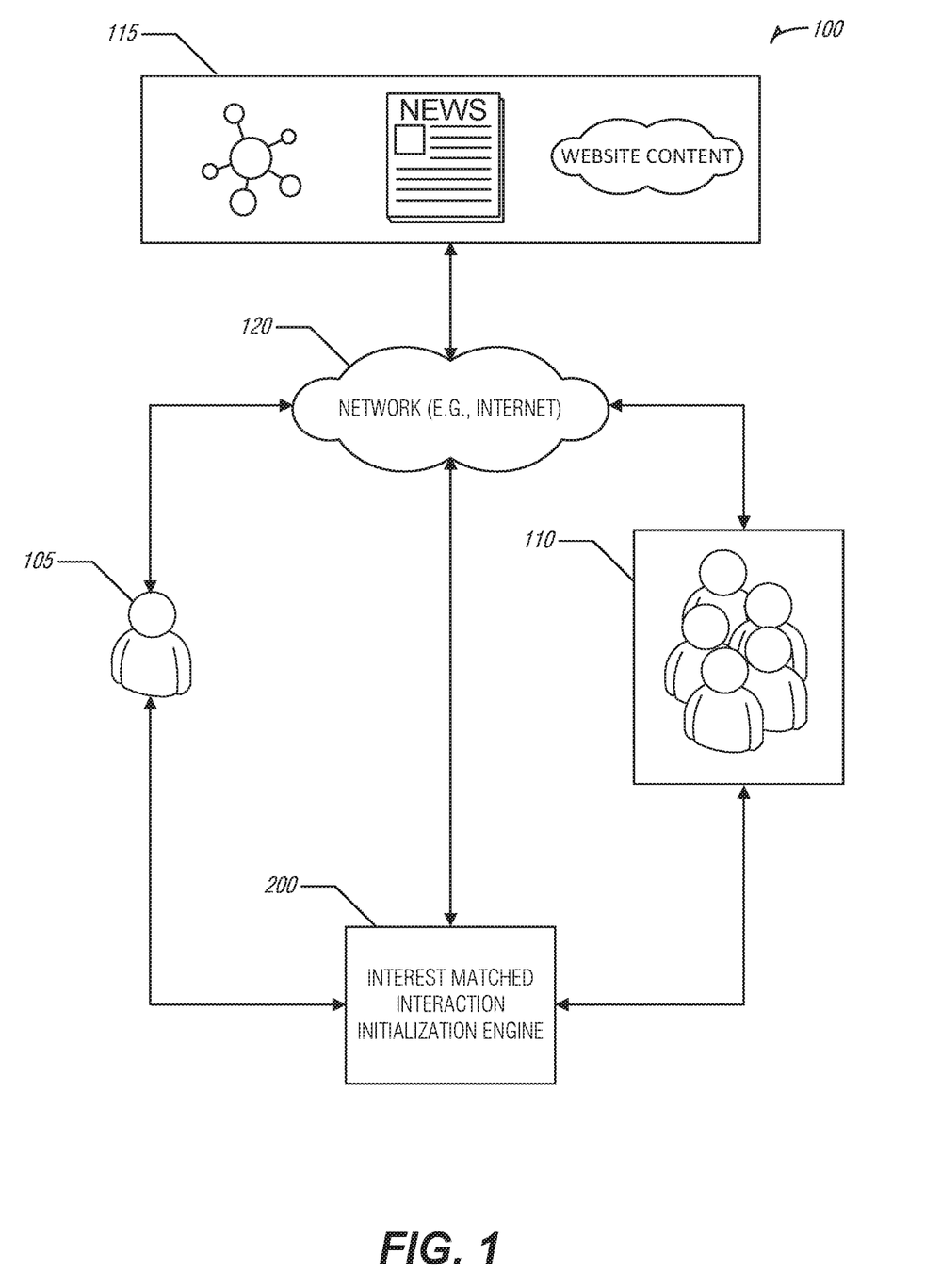
FIG. 1 illustrates an example of an environment and a system for interest matched interaction initialization, according to some embodiments.

FIG. 1 illustrates an example of an environment 100 and a system 200 for interest matched interaction initialization, according to some embodiments. The environment 100 may include a first user 105 (e.g., an employee of an organization, etc. one or more other users 110 (e.g., one or more customers of the organization, etc.), and an interest matched interaction initialization engine 200. The interest matched interaction initialization engine 200 may access a set of profile data corresponding to one of the one or more other users 110 and may be communicatively coupled via a network 120 (e.g., the internet, etc.) to a set of data sources 115 (e.g., social media websites, news services, website content, etc.). The user 105 and the one or more other users 110 may use computing devices attached to the network 120 and may provide and/or consume information in the set of data sources 115.

The user 105 may be a representative of an organization with which the one or more other users 110 have a relationship (e.g., business relationship, etc.) and may manage the relationship between the one or more other users 110 and the organization. The organization may maintain a user profile for each of the one or more other users 110 on a computing system (e.g., server, database, etc.). The each profile may include a variety of information including, for example, social media presence, news service preferences, email address, employer, schools attended, etc. The profile information may be used to determine which data sources of the set of data sources 115 (e.g., news sources, social media networks, website content, etc.) an individual included in the one or more other users 110 consumes information from and/or contributes to. For example, an individual's profile may include a social media presence for a social networking service and it may be determined that the user posts information to the social media service.

The interest matched interaction initialization engine 200 may be communicatively coupled to the set of data sources 115 via a network 120 (e.g., the internet, etc.). The interest matched interaction initialization engine 200 may analyze profile information of an individual (e.g., a member of the one or more other users 110) to determine data sources containing information indicating an interest in a subject. For example, prior interaction notes may contain an indication that the individual likes to visit a local barbecue restaurant blog and the interest matched interaction initialization engine 200 may determine that the local barbecue restaurant blog is a data source that contains information indicating an interest in barbecue restaurants. For example, latent dirichlet allocation (LDA) may be used to identify topics in the prior interaction notes by associating words with the topic barbecue restaurants and then identifying the topic based on the occurrence of the words in the prior interaction notes. For example, the barbecue restaurant topic may be associated with the words dry rub, Memphis, St. Louis, hickory smoked, Applewood smoked, etc. which LDA may use to identify that the barbecue restaurant topic appears in one or more of the prior interaction notes.

The interest matched interaction initialization engine 200 may gather data from the data sources and may generate a model (eg., using linear regression, decision tree, neural networks, rule-base classifier, etc.) for the interest using the gathered data. For example, the information from the local restaurant blog and from social media posts of the individual may be used to construct an interest vector model containing a variety of variables indicating a preference for barbecue restaurants. For example, the variables may include keyword counts, social media posting frequency, number of likes of social media posts involving barbecue restaurants, number of comments to blog posts involving barbecue restaurants, etc.

The interaction matched interaction initialization engine 200 may analyze the profile data of the user 105 to create a dataset to evaluate against the model. For example, the profile information may be used to determine data sources containing information about the user 105 such as social media activity, webpages visited, new sources visited, etc. The dataset of the user 105 may be evaluated against the model to determine the strength of interest the user 105 has in the subject. For example, the user 105 may have made several posts to social media involving barbecue restaurants, may have had previous discussions with other users regarding barbecue restaurants, and posted comments to a barbecue restaurant blog and the evaluation against the model may indicate a strong match between the individual and the user 105 for an interest in barbecue restaurants.

The interest matched interaction initialization engine 200 may identify content associated with the interest (e.g., one or more variables from the model, keywords, etc. from a dataset (e.g., gathered from the set of data sources 115, etc.) including information about the interest. For example, barbecue restaurant reviews may be evaluated using keywords such as ribs, smoke, sauce, etc. to identify a local restaurant and associated review that may be of interest to the user 105 and the individual.

The interest matched interaction initialization engine 200 may generate an interaction initialization item using the content. For example, a graphical user interface element may be generated indicating that the user 105 and the individual should visit an identified barbecue restaurant and discuss the individual's account. The interaction initialization item may be transmitted to a display device of the user 105. For example, the interaction initialization item may be transmitted to a client management portal of the user 105 for output on a computing device (e.g., smartphone, desktop computer, laptop computer, tablet, etc.) of the user 105. The user 105 may be able to interact with the interaction initialization item instructing the interest matched interaction initialization engine 200 to transmit the content to the individual. For example, the portal may include an image representing the individual and the user 105 may initiate transmission of the content by dragging the interaction initialization item over the image representing the individual.

The techniques described above increase the effectiveness of the profile management system and provide streamlined electronic communication between the user 105 and the individual potentially leading to better customer retention. While the example includes a discussion of interest matching regarding cuisine, it may be readily understood that the techniques would be equally useful in identifying matched interests in hobbies, news topics, etc.

Figure 2:
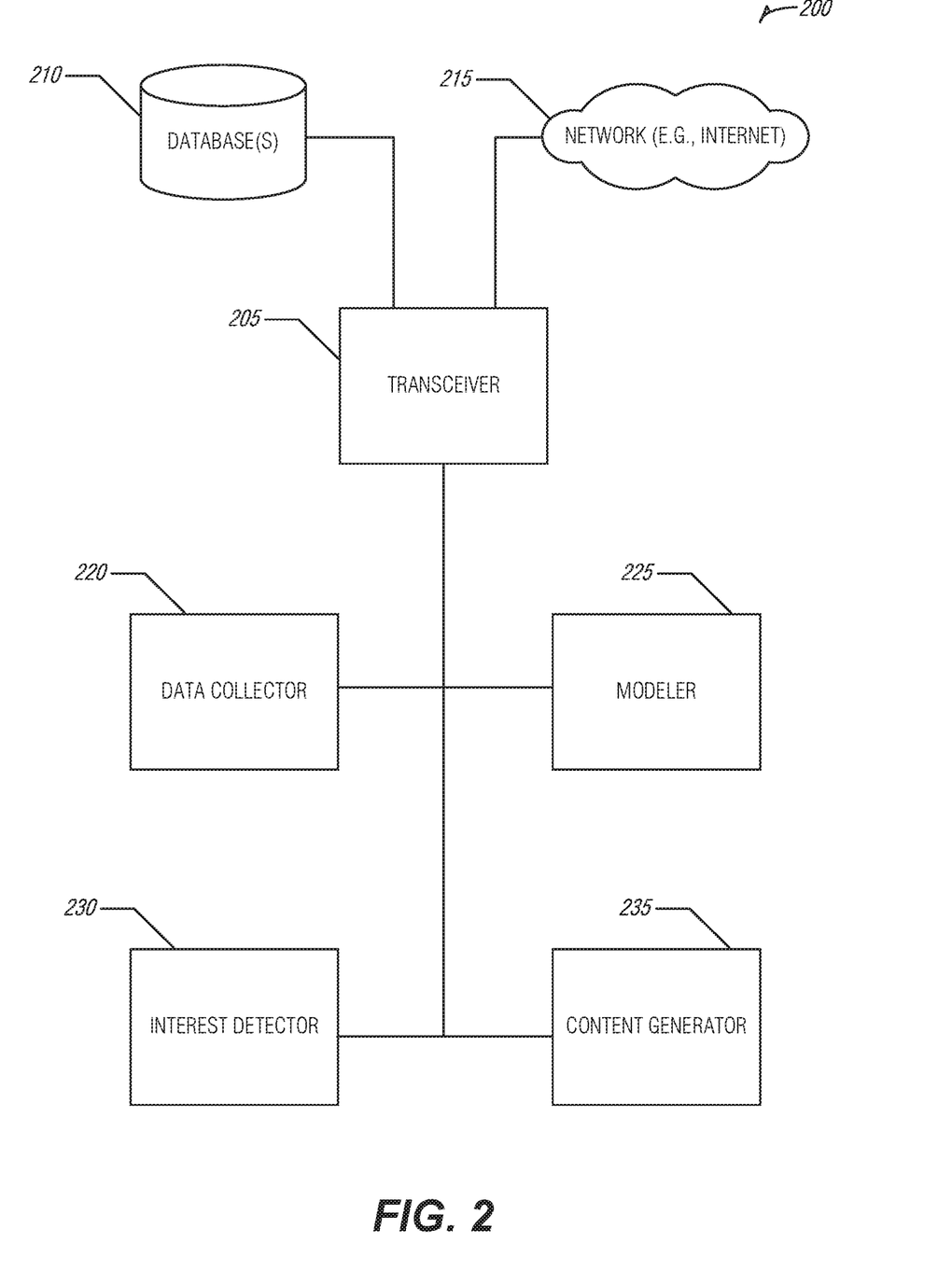
FIG. 2 illustrates a block diagram of an example of an interest matched interaction initialization engine for interest matched interaction initialization, according to some embodiments.

FIG. 2 illustrates a block diagram of an example of an interest matched interaction initialization engine 200 for interest matched interaction initialization, according to some embodiments. The interest matched interaction initialization engine 200 may include a transceiver 205 that is communicatively coupled to database(s) 210 and a network 215 (e.g., the internet, wired network, wireless network, etc.). The transceiver 205 may be communicatively coupled (e.g., over a network, shared bus, etc.) to a data collector 220, a modeler 225, an interest detector 230, and a content generator 235. The interest matched interaction initialization engine 200 may provide functionality as described in FIG. 1.

The transceiver 205 may process incoming and outgoing data. For example, the transceiver may transmit a request to the database(s) 210 and/or to a data source connected to the network 215 for input data. The transceiver 205 may forward the received input data to other components of the interest matched interaction initialization engine 200 such as the data collector 220, the modeler 225, the interest detector 230, and the content generator 235.

The transceiver may receive data from components of the interaction prediction and response engine 200 for outgoing transmission to the database(s) 210 and/or the network 215. For example, an interest initialization item generated by the content generator 235 may be transmitted to the transceiver for forwarding to a host connected to the network 215.

The database(s) 210 may include a variety of data structures storing information for use by the interaction prediction and interest matched interaction initialization engine 200. The database(s) 210 may include, by way of example and not limitation, a database containing interaction data describing interactions between individuals and an organization, a user profile database corresponding to individuals having a relationship with the organization (e.g., the one or more other users 110 as described in FIG. 1.), etc.

The data sources may include a variety of information including news articles, blog posts, social media posts, etc. The profile data may include information including topics discussed during interactions between an individual and an employee of the organization (e.g., user 105 as described in FIG. 1), social media presence, news outlets the individual visits, etc. The profile data may include user profile attributes. The user attributes may include demographic information such as the user's age, occupation, education level, educational institutions attended, etc. The user attributes may include information regarding the user's relationship with the organization including pervious interactions with the organization, business concerns (e.g., asset holdings, purchase history, etc.), preferences (e.g., contact preferences, etc.), etc.

The network 215 may provide access to a variety of network connected resources. For example, the network may provide access to internet-based resources, a corporate network, a local area network, etc. The network 215 may be used to communicate with a variety of data sources. For example, the data sources may include social media sites, news websites, news feeds, corporate websites, research databases, etc. The interest matched interaction initialization engine 200 may request data from the data sources for use in detecting the occurrence of events.

The data collector 220 may obtain a first set of profile attributes for a first user (e.g., an individual that is a member of the one or more other users 110 as described in FIG. 1) and a second set of profile attributes for a second user (e.g., the user 105 as described in FIG. 1). For example, profile attributes of an account owner, Pat, and a client manager, Sam may be obtained including demographic information, social media presence, websites visited, etc.

The data collector 220 may identify a first set of data sources using the first set of profile attributes and a second set of data sources using the second set of profile attributes. For example, Pat's data sources may be identified as a social media site, a restaurant blog, and a restaurant review website and Sam's data sources may be identified as an employee information database (e.g., included in the database(s) 210), a restaurant review site, and a restaurant blog based on information contained in the respective user profile of Pat and Sam. The data sources may be identified by evaluating the profile information of the users such as demographic information, preferences, previous interactions with the organization or other users, etc. included in the user profile attributes. For example, the social media data source may be identified for Pat based on a social media presence included in the attributes and the restaurant review website may be identified for Sam based on the website being included in notes from a discussion with another client.

The data collector 220 may collect a first dataset using the first set of data sources and a second dataset using the second set of data sources. For example, the data sets may be gathered using an application program interface (API) of a data source to obtain access to a data repository of the data source. In another example, data (e.g., text, etc.) may be scraped from a website of a data source. For example, a dataset may be collected for Pat from the social media site, the restaurant blog, and the restaurant review website and a dataset may be collected for Sam's from the employee information database, the restaurant review site, and the restaurant blog. Each dataset may include a variety of information gathered from the data sources such as, keywords, topics, frequency of posts, frequency of visit, likes for posts, comments for posts, etc. For example, Pat's dataset may include the most common keywords from the restaurant blog.

The modeler 225 may generate an interest vector model sing data elements of the first dataset based on an interest identified in the first dataset. For example, the modeler 225 may include a set of interest reference models indicating various interest types and subtypes that are used to identify an interest in the first dataset. For example, a reference model for restaurants may include variables including a variety of keywords, websites, etc. that may indicate an interest in restaurants and the first dataset may be evaluated against the interest reference model to identify an interest in restaurants. The interest vector model may be generated by analyzing the first dataset to extract a set of variables against which another dataset may be evaluated to identify a shared interest. In some examples, the interest vector model may use the reference model as a baseline and the interest vector model may be a version of the reference model modified to include the variables identified in the first dataset. Thus, the modeler 225 may be able to increase the accuracy of matching the first user's particularized interest.

In some examples, prior interaction data describing one or more previous interactions between the first user and the second user may be obtained from the first dataset. For example, the Pat's dataset may include text from previous interactions (e.g., email, telephone calls, etc.) with Sam and data from those interaction may be gathered. The prior interaction data may be evaluate to identify at least one interest keyword of a set of interest keywords corresponding to the interest. For example, a reference model may include a list of keywords indicating an interest in barbecue restaurants including ribs, sauce, smoke, bones, Memphis style, St. Louis style, Carolina style, etc. The keywords may be used to identify the interest in the first dataset. In some examples, a threshold may be used to determine whether data is sufficient to demonstrate an interest in a topic. For example, the interest reference model may indicate that if data from a previous interaction between Pat and Sam includes more than 3 of the keywords then Pat has an interest in barbecue restaurants. In some examples, decision trees, random forests, and/or other classification techniques may be used to generate a model for a person with a given interest. In an example, the model may be trained using the data sets and mechanical turk generated labels which may be used to classify an interest in a topic.

In some examples, purchase history data of the first user may be obtained from the first dataset. For example, Pat's profile data may include a listing of purchases made and the data relating to those purchases (e.g., seller, product or service purchased, amount of purchase, etc. may be included in Pat's profile attributes. The purchase history may be evaluated to identify a transaction associated with the interest. For example, Pat may have paid for food at 2 different barbecue restaurants during the most recent month and the interest reference model may indicate that 2 or more purchases from a barbecue restaurant indicates an interest in barbecue restaurants.

The interest detector 230 may evaluate the second dataset using the interest vector model to identify the interest in the second dataset. For example, the data elements in Sam's dataset such as interactions with other clients and website activity may be evaluated using the interest vector model to identify that Sam has an interest in barbecue restaurants. For example, Sam's comments on blog posts and discussions with Pat and other clients may establish that Sam's interest level falls within a region of a vector map represented by the interest vector model indicating a strong match for an interest in barbecue restaurants.

In some examples, the interest of the first user and matching the interest to the second user may be performed in real-time. For example, Pat and Sam may be discussing Pat's account over the telephone and Pat's interest may be identified and matched to Sam during the call. Interaction data for an interaction between the first user and the second user may be obtained in real time. For example, data may be obtained from the call occurring between Pat and Sam. The interaction data may be evaluated in real time using natural language processing to identify language elements associated with the interest. For example the interaction and voices of Pat and Sam may be monitored using hardware to collect data regarding the interaction including the ongoing discussion. For example, keywords may be obtained from the discussion occurring between Pat and Sam and the keywords may be matched to a model indicating an interest in barbecue restaurants. Sam's profile information may be analyzed against the same model or a model refined by the keywords to identify Sam's interest in barbecue restaurants.

The content generator 235 may generate an interaction initialization item by identifying content associated with the interest in a third dataset. For example, elements in the interest vector model may be used to determine a dataset corresponding to the interest (e.g., websites, restaurant reviews, etc.) and content items such as an article, restaurant review, etc. may be identified as associated with the interest. For example, a barbecue restaurant review may be identified as associated with the shared interest in barbecue restaurants of Pat and Sam and the interaction initialization item may include a link to the review and a message indicating that Pat and Sam should discuss Pat's account over dinner at the barbecue restaurant.

The interaction initialization item may be transmitted (e.g., using the transceiver 205, etc.) to a display device. The display device may provide a graphical user interface to the second user. For example, Sam may be presented with a graphical representation of the interaction initialization item on a display of a computing device. In some examples, a web portal may be generated for display on the display device. A first graphical interface element may be transmitted to the web portal representing the first user. For example, a graphical representation (e.g., a photo, icon, etc.) of Pat may be transmitted to the web portal. A second graphical interface element may be transmitted to the web portal representing the interaction initialization item. For example, a text box, icon, etc. may be transmitted to Sam's web portal representing the barbecue restaurant review and the suggestion to discuss Pat's account over dinner. The interaction initialization item may be sent (e.g., using the transceiver 205) to the first user upon detection of the second graphical user interface element overlapping an area occupied by the first graphical interface element. For example, the restaurant review and the suggestion to discuss Pat's account over dinner may be transmitted to Pat upon Sam dragging and dropping the representation of the interaction initialization item to the graphical representation of Pat.

In some examples, the content generator 235 may identify a communication channel preference for the first user using the first set of profile attributes. For example, user profile attributes such as, for example, previous interactions, communication preferences, notes, etc. may be analyzed to determine a communication channel preference for the user profile. Communication channels may include, by way of example and not limitation, email, telephone, social media, blog post, etc. The interaction initialization item may be generated using the communication channel preference. For example, Pat may prefer social media as a communication channel and one of the generated options may be a message to be send via a messaging feature of a social network and when Sam interacts with (e.g., drag and drop, selecting, etc.) the interaction initialization item the content may be sent to Pat using the messaging feature of the social network.

In some examples, the content generator 235 may determine a current communication channel of the first user. For example, Pat's user profile may, include a social media presence and it may be determined that Pat is currently present on the social network. In another example, Pat may have recently initiated interaction regarding an unrelated topic via telephone and it may be determined that Pat is currently available via telephone.

The transceiver 205, database(s) 210, data collector 220, modeler 225, interest detector 230, and content generator 235 may be implemented in hardware, software, or some combination of hardware and software. The transceiver 205, database(s) 210, data collector 220, modeler 225, interest detector 230, and content generator 235 may be implemented in the same computing system (e.g., a single server, a collection of servers, a cloud-based computing platform, etc.) or may be implemented in one or more other computing systems.

The techniques described above increase the effectiveness of a profile management system and provide streamlined electronic communication between the first user and the second user potentially leading to better customer retention. While the example includes a discussion of interest matching regarding cuisine in a client-account manager context, it may be readily understood that the techniques would be equally useful in identifying matched interests in hobbies, news topics, etc. in a variety of interpersonal contexts.

Figure 3:
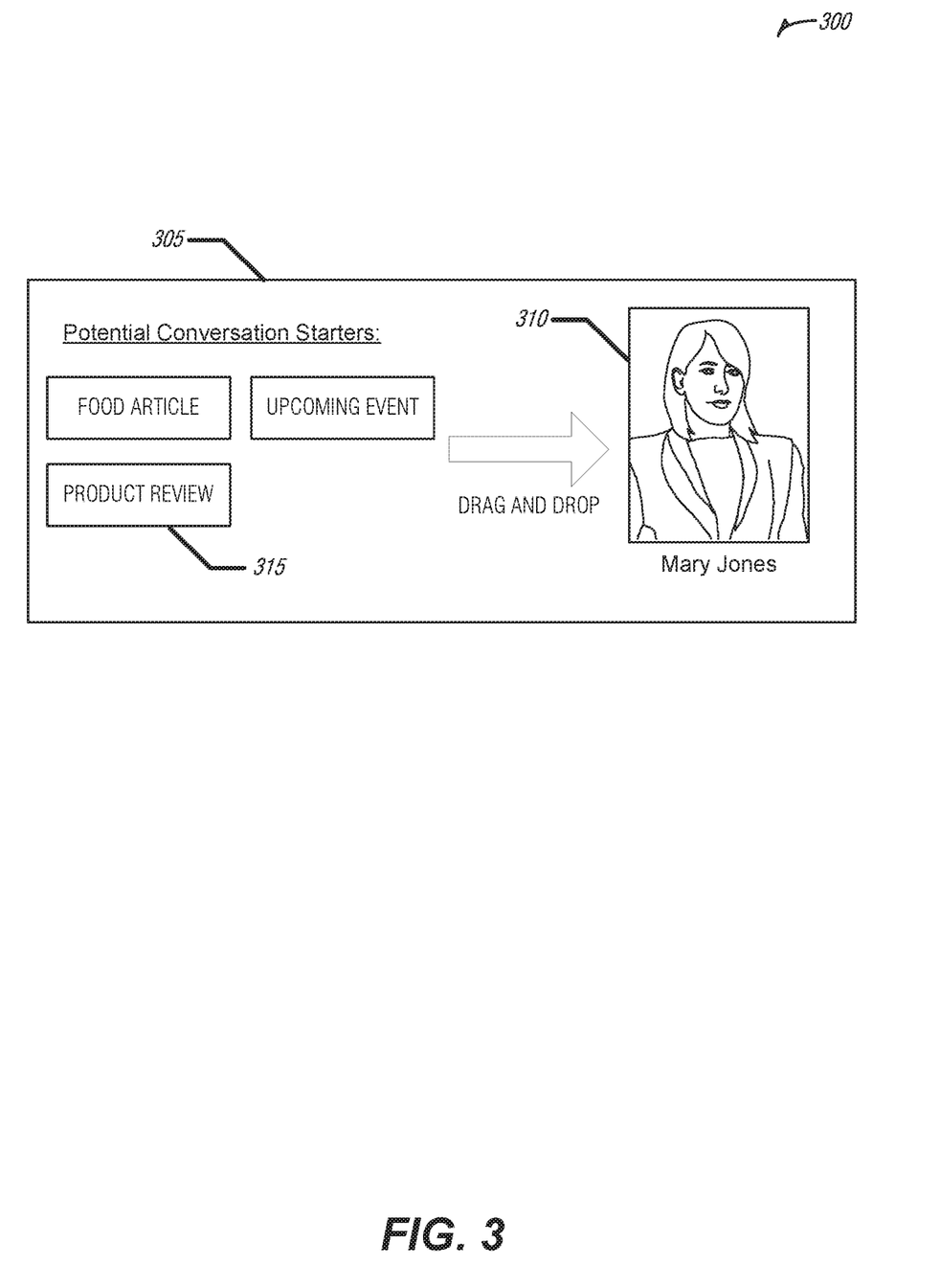
FIG. 3 illustrates flow diagram of an example of an interactive graphical user interface for interest matched interaction initialization, according to some embodiments.

FIG. 3 illustrates flow diagram of an example of an interactive graphical user interface 300 for interest matched interaction initialization, according to some embodiments. The interactive graphical user interface 300 may be used in implementation of the interest matched interaction initialization engine 200 as described in FIG. 2. The interactive graphical user interface 300 may include an interactive window 305 containing a variety of interactive user interface elements such as an interaction initialization item 315 and a graphical representation of another user 310.

The graphical representation of the other user 310 may represent a user (e.g., an individual member of the one or more other users 110 as described in FIG. 1, etc.). A user (e.g., user 105 as described in FIG. 1) may interact with the graphical representation of the other user 310 to obtain additional information regarding the user represented. The user of the interactive graphical user interface 300 may be presented with a variety of graphical representations of other users which are managed by the user. For example, an account manager may be presented with a representation for a client associated with each manage account.

The interaction initialization item 315 may be generated by the content generator 235 as described in FIG. 2. The interaction initialization item 315 may be a graphical representation of content identified as associated with an interest matched between the user and the other user and may include a variety of information such as, for example, web links, text, maps, etc. The interaction initialization item 315 may be presented along with the corresponding graphical representation of the other user 310 (e.g., in linear relationship to, in a graph with, connected to, in a hierarchy with, etc. the representation of its corresponding user).

Several interaction initialization items including interaction initialization item 315 may be generated and displayed for the graphical representation of the other user 310. In cases where several graphical representations of other users are displayed, each may be presented along with multiple interaction initialization items corresponding to each of the graphical representations of the other users.

The user of the interactive graphical user interface 300 may interact with the interactive window 305 to initiate actions to be performed (e.g., by the interest matched interaction initialization engine 200 as described in FIG. 2.). For example, the user may drag the interaction initialization item 315 onto the graphical representation of the other user 315 which may be detected as initiation of a send routine that may send the interaction initialization item and/or related content to the user.

Figure 4:
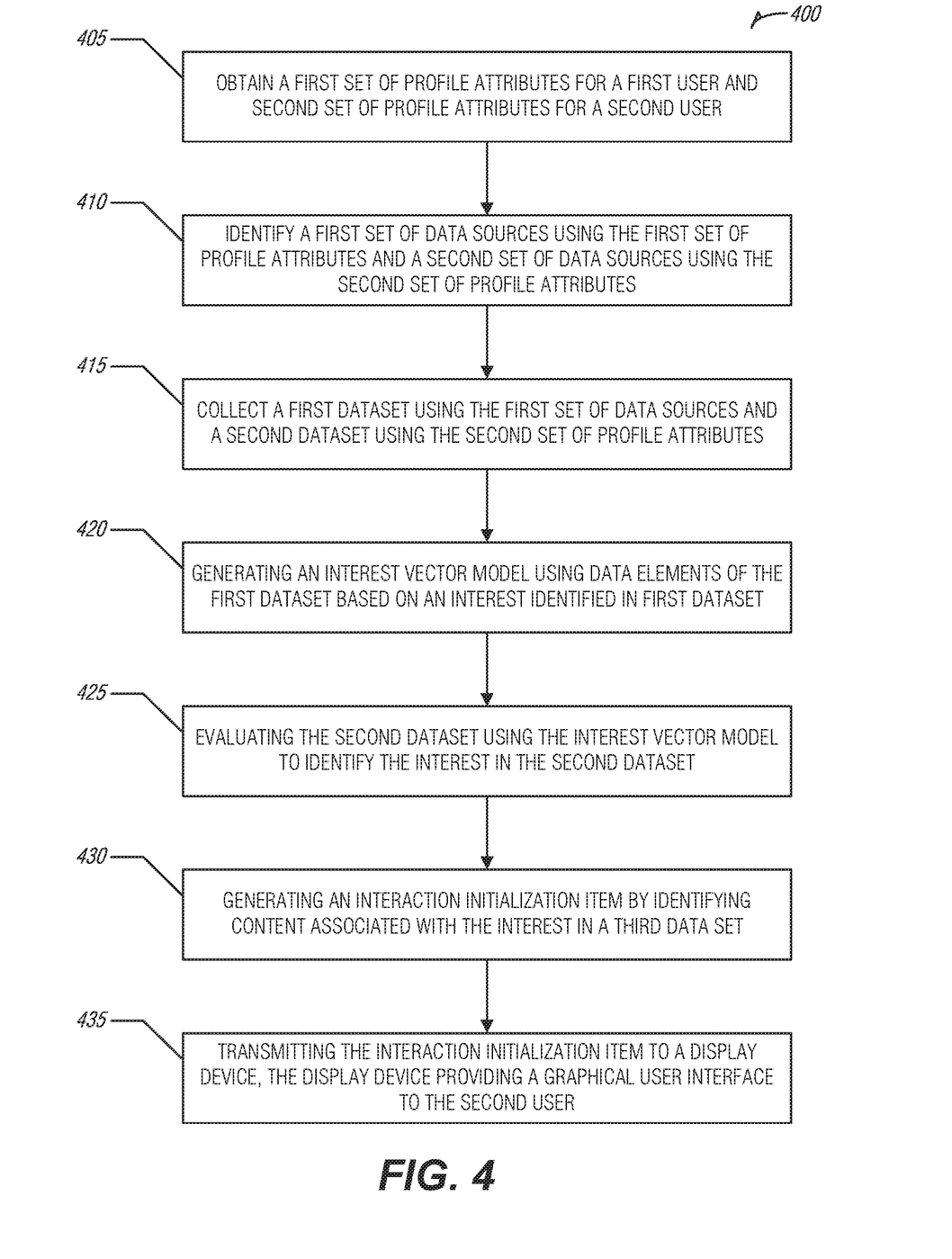
FIG. 4 illustrates flow diagram of an example of a method for interest matched interaction initialization, according to some embodiments.

FIG. 4 illustrates flow diagram of an example of a method 400 for interest matched interaction initialization, according to some embodiments. The method 400 may perform a variety of operations of the interest matched interaction initialization engine 200 as described in FIGS. 1 & 2.

At operation 405, a first set of profile attributes for a first user and second set of profile attributes for a second user may be obtained (e.g., by the data collector 220 using the transceiver 205 as described in FIG. 2).

At operation 410, a first set of data sources may be identified (e.g., by the data collector 220 as described in FIG. 2) using the first set of profile attributes and a second set of data sources may be identified (e.g., by the data collector 220 as described in FIG. 2) using the second set of profile attributes.

At operation 415, a first dataset may be collected (e.g., by the data collector 220 as described in FIG. 2) using the first set of data sources and a second dataset may be collected (e.g., by the data collector 220 as described in FIG. 2) using the second set of data sources.

At operation 420, an interest vector model may be generated (e.g., by the modeler 225 as described in FIG. 2) using data elements of the first dataset based on an interest identified (e.g. by the data modeler 225 as described in FIG. 2) in the first dataset. In an example, prior interaction data may be obtained describing one or more previous interactions between the first user and the second user from the first dataset. The prior interaction data may be evaluated to identify at least one interest keyword of a set of interest keywords corresponding to the interest and the interest may be identified using the at least one interest keyword. In an example, purchase history data of the first user may be obtained from the first dataset. The purchase history data may be evaluated to identify a transaction associated with the interest and the interest may be identified using the transaction associated with the interest. In an example, the first set of profile attributes may be evaluated using an interest model corresponding to the interest to identify the interest.

In some examples, interaction data for an interaction between the first user and the second user may be obtained in real time. The interaction data may be evaluated in real time using natural language processing to identify language elements associated with the interest and the interest may be identified using the language elements.

At operation 425, the second dataset may be evaluated (e.g., by the interest detector 230 as described in FIG. 2) using the interest vector model to identify the interest in the second dataset.

At operation 430, an interaction initialization item may be generated (e.g., by the content generator 235 as described in FIG. 2) by identifying content associated with the interest in a third dataset.

At operation 435, the interaction initialization item may be transmitted (e.g., by the content generator 235 using the transceiver 205) to a display device. The display device may provide a graphical user interface to the second user. In some examples, a web portal may be generated (e.g., by the content generator 235 as described in FIG. 2) for display on the display device. A first graphical interface element may be transmitted (e.g., using the transceiver 205 as described in FIG. 2) to the web portal representing the first user. A second graphical interface element may be transmitted (e.g., using the transceiver 205 as described in FIG. 2) to the web portal representing the interaction initialization item and the interaction initialization item may be sent (e.g., using the transceiver 205 as described in FIG. 2) to the first user upon detection of the second graphical interface element overlapping an area occupied by the first graphical interface element.

In some examples, a communication channel preference may be identified for the first user using the first set of profile attributes. The interaction initialization item may be generated to be transmitted using the communication channel preference.

Figure 5:
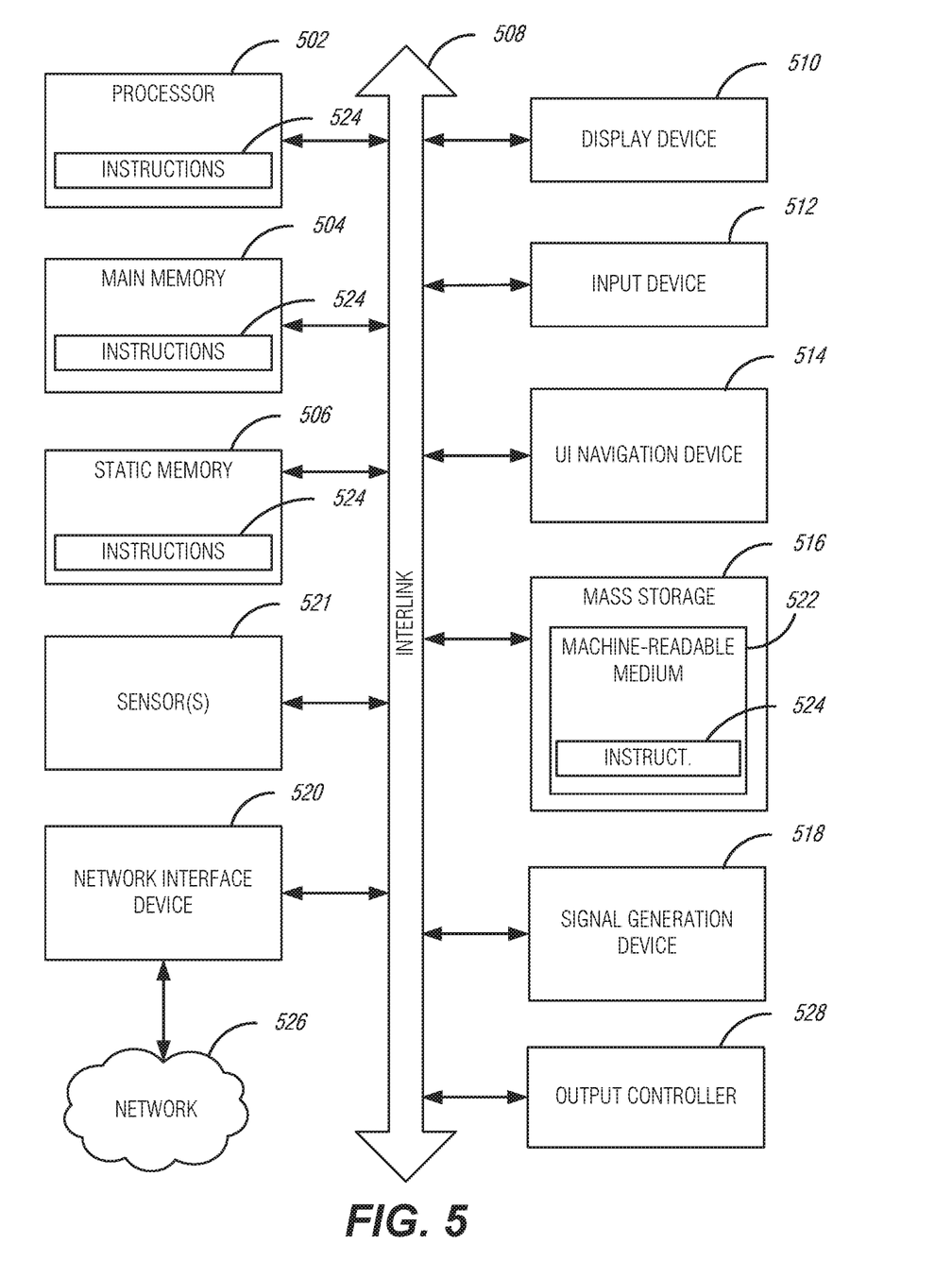
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing; encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However; the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also; in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for interest matched interaction initialization, the system comprising:
at least one processor; and
a memory including instructions that, when executed by the at least one processor, cause the at least one processor to perform operations to:
obtain a first set of profile attributes for a first user and second set of profile attributes for a second user;
identify a first set of data sources using the first set of profile attributes and a second set of data sources using the second set of profile attributes;
collect a first dataset using the first set of data sources and a second dataset using the second set of data sources, wherein the first dataset includes text of an information exchange between the first user and the second user;
generate an interest vector model using data elements of the first dataset based on an interest identified in the first dataset, wherein the interest vector model includes variables indicating a preference for the interest and wherein the variables include a keyword count for keywords related to the interest, social media posting frequency corresponding to the interest, number of likes of social media posts corresponding to the interest, and a number of comments posted for content corresponding to the interest;
evaluate the second dataset using the interest vector model to identify the interest in the second dataset and to identify the interest as a shared interest, wherein the interest is identified in part based on the text of the information exchange between the first user and the second user that correspond to the keywords of the keyword count variable of the interest vector model;
determine a current communication channel in use by the second user at a time of the evaluation using the second set of profile attributes;
generate an interaction initialization item using the current communication channel by identifying content associated with the shared interest in a third dataset; and
transmit the interaction initialization item to a display device using the current communication channel, wherein the display device provides a graphical user interface to the second user.

2. The system of claim 1, further comprising operations to:
generate a web portal for display on the display device;
transmit a first graphical interface element to the web portal that represents the first user;
transmit a second graphical interface element to the web portal that represents the interaction initialization item; and
send the interaction initialization item to the first user upon detection that the second graphical interface element overlaps an area occupied by the first graphical interface element.

3. The system of claim 1, the operations to identify the interest in the first dataset further comprising operations to:
obtain prior interaction data describing one or more previous interactions between the first user and the second user from the first dataset; and
evaluate the prior interaction data to identify at least one interest keyword of a set of interest keywords corresponding to the interest.

4. The system of claim 1, the operations to identify the interest in the first dataset further comprising operations to:
obtain purchase history data of the first user from the first dataset; and
evaluate the purchase history data to identify a transaction associated with the interest.

5. The system of claim 1, the operations to identify the interest in the first dataset further comprising operations to evaluate the first set of profile attributes using an interest model corresponding to the interest.

6. The system of claim 1, the operations to identify the interest in the first data set further comprising operations to:
obtain, in real time, interaction data for the information exchange between the first user and the second user; and
evaluate the interaction data, in real time, using natural language processing to identify language elements associated with the interest in the text of the information exchange.

7. The system of claim 1, the operations to generate the interaction initialization item further comprising operations to:
identify a communication channel preference for the first user using the first set of profile attributes; and
generate the interaction initialization item to be transmitted using the communication channel preference.

8. At least one computer readable medium including instructions for interest matched interaction initialization that, when executed by a computer, cause the computer to perform operations to:
obtain a first set of profile attributes for a first user and second set of profile attributes for a second user;
identify a first set of data sources using the first set of profile attributes and a second set of data sources using the second set of profile attributes;
collect a first dataset using the first set of data sources and a second dataset using the second set of data sources, wherein the first dataset includes text of an information exchange between the first user and the second user;
generate an interest vector model using data elements of the first dataset based on an interest identified in the first dataset, wherein the interest vector model includes variables indicating a preference for the interest, and wherein the variables include a keyword count for keywords related to the interest, social media posting frequency corresponding to the interest, number of likes of social media posts corresponding to the interest, and a number of comments posted for content corresponding to the interest;
evaluate the second dataset using the interest vector model to identify the interest in the second dataset and to identify the interest as a shared interest, wherein the interest is identified in part based on the text of the information exchange between the first user and the second user that correspond to the keywords of the keyword count variable of the interest vector model;
determine a current communication channel in use by the second user at a time of the evaluation using the second set of profile attributes;
generate an interaction initialization item using the current communication channel by identifying content associated with the shared interest in a third dataset; and
transmit the interaction initialization item to a display device using the current communication channel, wherein the display device provides a graphical user interface to the second user.

9. The at east one computer readable medium of claim 8, further comprising operations to:
generate a web portal for display on the display device;
transmit a first graphical interface element to the web portal that represents the first user;
transmit a second graphical interface element to the web portal that represents the interaction initialization item; and
send the interaction initialization item to the first user upon detection that the second graphical interface element overlaps an area occupied by the first graphical interface element.

10. The at least one computer readable medium of claim 8, the operations to identify the interest in the first dataset further comprising operations to:
obtain prior interaction data describing one or more previous interactions between the first user and the second user from the first dataset; and
evaluate the prior interaction data to identify at least one interest keyword of a set of interest keywords corresponding to the interest.

11. The at least one computer readable medium of claim 8, the operations to identify the interest in the first dataset further comprising operations to:
obtain purchase history data of the first user from the first dataset; and
evaluate the purchase history data to identify a transaction associated with the interest.

12. The at least one computer readable medium of claim 8, the operations to identify the interest in the first dataset further comprising operations to evaluate the first set of profile attributes using an interest model corresponding to the interest.

13. The at least one computer readable medium of claim 8, the operations to identify the interest in the first data set further comprising operations to:
obtain, in real time, interaction data for the information exchange between the first user and the second user; and
evaluate the interaction data, in real time, using natural language processing to identify language elements associated with the interest in the text of the information exchange.

14. The at least one computer readable medium of claim 8, the operations to generate the interaction initialization item further comprising operations to:
identify a communication channel preference for the first user using the first set of profile attributes; and
generate the interaction initialization item to be transmitted using the communication channel preference.

15. A method for interest matched interaction initialization, the method comprising:
obtaining a first set of profile attributes for a first user and second set of profile attributes for a second user;
identifying a first set of data sources using the first set of profile attributes and a second set of data sources using the second set of profile attributes;
collecting a first dataset using the first set of data sources and a second dataset using the second set of data sources, wherein the first dataset includes text of an information exchange between the first user and the second user;
generating an interest vector model using data elements of the first dataset based on an interest identified in the first dataset, wherein the interest vector model includes variables indicating a preference for the interest, and wherein the variables include a keyword count for keywords related to the interest, social media posting frequency corresponding to the interest, number of likes of social media posts corresponding to the interest and a number of comments posted for content corresponding to the interest;
evaluating the second dataset using the interest vector model to identify the interest in the second dataset and to identify the interest as a shared interest, wherein the interest is identified in part based on the text of the information exchange between the first user and the second user that correspond to the keywords of the keyword count variable of the interest vector model;
determining a current communication channel in use by the second user at a time of the evaluation using the second set of profile attributes;
generating an interaction initialization item using the current communication channel by identifying content associated with the shared interest in a third dataset; and
transmitting the interaction initialization item to a display device using the current communication channel, the display device providing a graphical user interface to the second user.

16. The method of claim 15, further comprising:
generating a web portal for display on the display device;
transmitting a first graphical interface element to the web portal representing the first user;
transmitting a second graphical interface element to the web portal representing the interaction initialization item; and
sending the interaction initialization item to the first user upon detection of the second graphical interface element overlapping an area occupied by the first graphical interface element.

17. The method of claim 15, identifying the interest in the first dataset further comprising:
obtaining prior interaction data describing one or more previous interactions between the first user and the second user from the first dataset; and
evaluating the prior interaction data to identify at least one interest keyword of a set of interest keywords corresponding to the interest.

18. The method of claim 15, identifying the interest in the first dataset further comprising:
obtaining purchase history data of the first user from the first dataset; and
evaluating the purchase history data to identify a transaction associated with the interest.

19. The method of claim 15, identifying the interest in the first dataset further comprising evaluating the first set of profile attributes using an interest model corresponding to the interest.

20. The method of claim 15, identifying the interest in the first data set further comprising:

obtaining, in real time, interaction data for the information exchange between the first user and the second user; and evaluating the interaction data, in real time, using natural language processing to identify language elements associated with the interest in the text of the information exchange.

21. The method of claim 15, generating the interaction initialization item further comprising:

identifying a communication channel preference for the first user using the first set of profile attributes; and generating the interaction initialization item to be transmitted using the communication channel preference.

\* \* \* \* \*